United States Patent
Muramatsu et al.

[11] Patent Number: 5,987,264
[45] Date of Patent: Nov. 16, 1999

[54] METHOD AND APPARATUS FOR REMOVING PROTECTION FILM FROM FLASH REFLECTOR

[75] Inventors: Masayoshi Muramatsu; Kenichi Watanabe, both of Kanagawa, Japan

[73] Assignee: Fuji Photo Film Co., Ltd., Kanagawa, Japan

[21] Appl. No.: 09/181,663

[22] Filed: Oct. 29, 1998

[30] Foreign Application Priority Data

Nov. 21, 1997 [JP] Japan ..................... 9-321260

[51] Int. Cl.⁶ ................................. G03B 15/03
[52] U.S. Cl. ........................................ 396/200
[58] Field of Search ..................... 396/155, 200; 362/3, 16

[56] References Cited

U.S. PATENT DOCUMENTS 4,412,276 10/1983 Blinow ..................... 362/16 X
5,371,563 12/1994 Dassero et al. ..................... 362/200

Primary Examiner—W. B. Perkey
Attorney, Agent, or Firm—Sughrue, Mion, Zinn, Macpeak & Seas, PLLC

[57] ABSTRACT

A flash reflector of a flash device is formed by blanking and folding a metal sheet with a mirror surface. The mirror surface is covered with a protection film for protecting the mirror surface from being scratched or stained. Before a flash discharge tube is mounted in the flash reflector, the flash reflector is placed under a protection film removing device, with the mirror surface upside. The protection film removing device shoots gas at corners of a face end of the flash reflector to blow the protection film off the mirror surface, and then sucks the protection film into a vacuum suction tube.

6 Claims, 6 Drawing Sheets

METHOD AND APPARATUS FOR REMOVING PROTECTION FILM FROM FLASH REFLECTOR

BACKGROUND OF THE INVENTION

1. Field of the Invention

The present invention relates to a method for removing protection films from flash reflectors of flash devices, especially those of lens-fitted photo film units. The present invention also relates to an apparatus for the inventive method.

2. Background Arts

Many cameras and lens-fitted photo film units are provided with a flash device. The flash device in general consists of a flash discharge tube, a flash reflector for reflecting flash light from the flash discharge tube to project it toward a photographic subject, a protector plate placed in front of the flash discharge tube, and a flash circuit for causing the flash discharge tube to flash.

The flash reflector is made of a metal sheet, and has a mirror surface for effectively projecting the flash light toward the subject. The mirror surface is apt to get scratched, although scratches or stains on the mirror surface cause irregular reflection of the flash light, and lower the efficiency of flash light projection. Particularly in a manufacturing process of the lens-fitted photo film units, where the flash reflectors are made of a metal sheet by blanking and then transported to an assembly process, the possibility of damaging the mirror surfaces of the flash reflectors is very high during the transportation from the blanking process to the assembly process, as well as during the assembly.

In order to protect the mirror surface of the flash reflector from the scratches and dusts during the manufacturing of the lens-fitted photo film unit, the mirror surface of the metal sheet is covered with a protection film, e.g. a flexible resin film. The protection film remains being attached to the mirror surface while the metal sheet is blanked and formed into the flash reflector. The flash reflector with the projection film thereon is transported to the assembly process. The protection film is removed from the mirror surface immediately before the flash reflector is assembled into the flash device. Conventionally, the protection film is removed manually by use of a pair of forceps or tweezers or the like.

Manual removal of the protection film from the individual flash reflector is apparently time-consuming and labor intensive. It has been one of the most serious obstacle to production efficiency of the lens-fitted photo film unit. In addition, the mirror surface of the flash reflector can be damaged by the tool like the forceps on removing the protection film from the mirror surface.

SUMMARY OF THE INVENTION

In view of the forgoing, a prime object of the present invention is to provide a method and an apparatus, by which the protection film is automatically, efficiently and reliably removed from the flash reflector without damaging the mirror surface.

To achieve the above object, in a method of removing a protection film from a flash reflector of a flash device, the flash reflector having a concave mirror surface for reflecting light from a flash discharge tube mounted inside the flash reflector, the flash reflector being formed by blanking and folding a metal sheet with the mirror surface, the mirror surface having been covered with the protection film before the flash discharge tube is mounted in the flash reflector, the present invention comprising the steps of: shooting gas at corners of a face end of the flash reflector to blow the protection film off the mirror surface; and thereafter sucking the protection film out of the flash reflector by vacuum suction.

According to the invention, an apparatus for removing the protection film from the flash reflector comprising: gas jet nozzles for shooting gas at a face end of the flash reflector to blow the protection film off the mirror surface, the gas jet nozzles being inclined radially outward the flash reflector at an angle of 0° to 45° with respect to a tangent to the face end of the mirror surface or to a prolonged line from the mirror surface; and a vacuum suction tube that is opposed to a center of the mirror surface of the flash reflector for sucking the protection film after being blown off the mirror surface.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
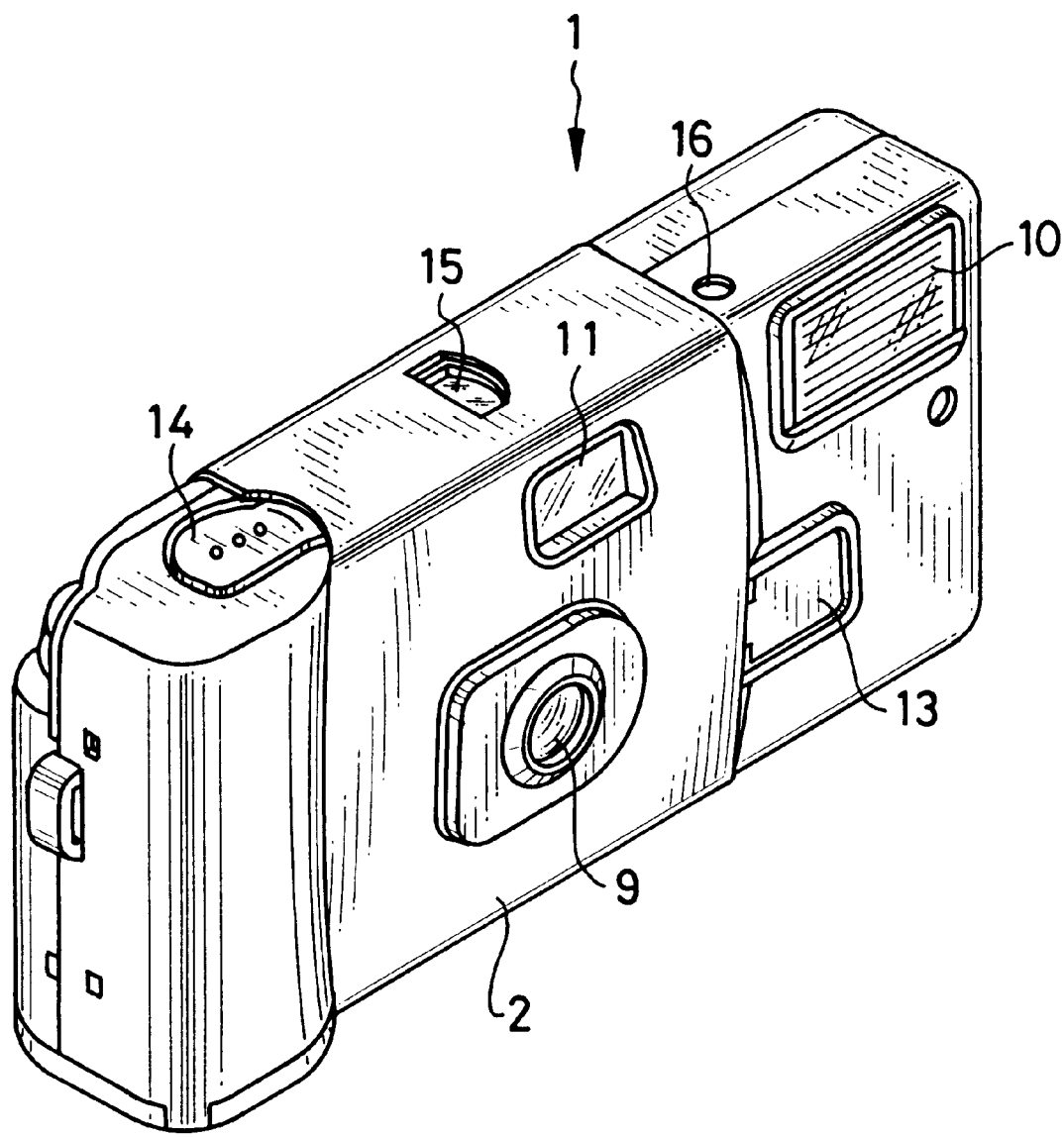
FIG. 1 is a perspective view of a lens-fitted photo film unit.
Figure 2:
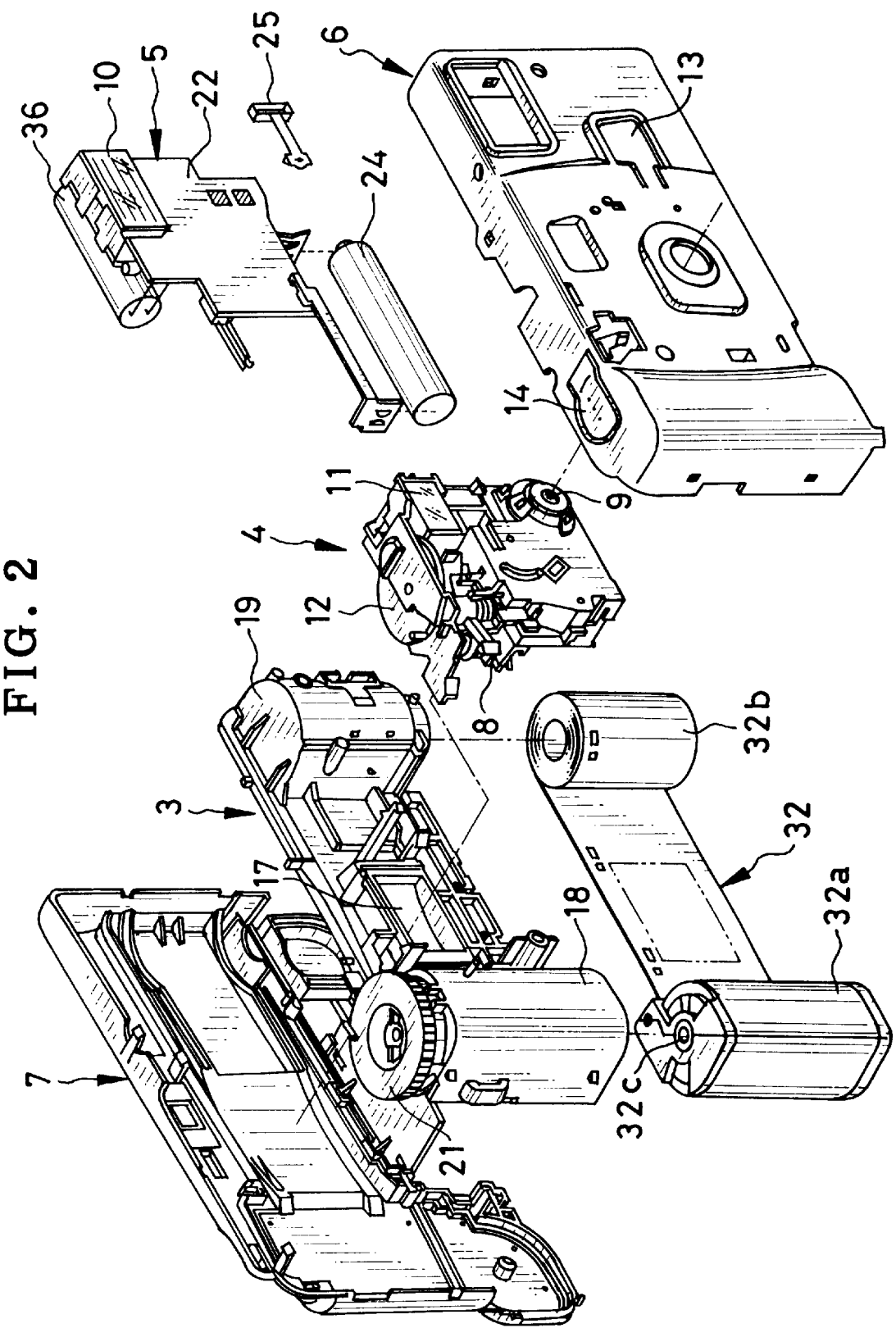
FIG. 2 is an exploded perspective view of the lens-fitted photo film unit of FIG. 1.

FIG. 1 shows an example of lens-fitted photo film unit 1, hereinafter called the film unit 1, that may be manufactured by using the protection film removing method of the present invention. Designated by 2 is a wrapping device for partly wrapping the film unit 1. As shown in FIG. 2, the lens-fitted photo film unit 1 is constituted of a main body portion 3 containing a photo film cartridge 32, a photographic assembly 4 and a flash device 5 which are mounted to the main body portion 3, and front and rear covers 6 and 7 for closing the main body portion 3, the exposure mechanism 4 and the flash device 5.

The main body portion 3 has an exposure aperture 17, and a cartridge chamber 18 and a film roll chamber 19 on opposite sides of the exposure aperture 17. The cartridge chamber 18 holds a cartridge shell 32a of the photo film cartridge 32, whereas the film roll chamber 19 holds a roll of unexposed photo filmstrip 32b. A film winding wheel 21 is mounted atop the cartridge chamber 32a, and is engaged with a spool 32c of the cartridge shell 32a. Since the photo filmstrip 32b is secured to the spool 32c, the photo filmstrip 32b is wound into the cartridge shell 32a one frame after each exposure by rotating the film winding wheel 21.

The photographic assembly 4 includes a shutter mechanism 8, a taking lens 9, a finder 11, a frame counter disc 12 and other essential elements necessary for photography. The taking lens 9, the finder 11, and a light projecting portion 10 of the flash device 5 are exposed through openings of the front cover 6. A flash charge button 13 and a shutter release button 14 are formed integrally with the front cover 6. The frame counter disc 12 is viewed through a frame counter window 15 formed on a top side of the film unit 1. A charge condition indicator hole 16 is also formed on the top side of the film unit 1, for indicating that the flash device 5 completes being charged for flashing.

Figure 3:
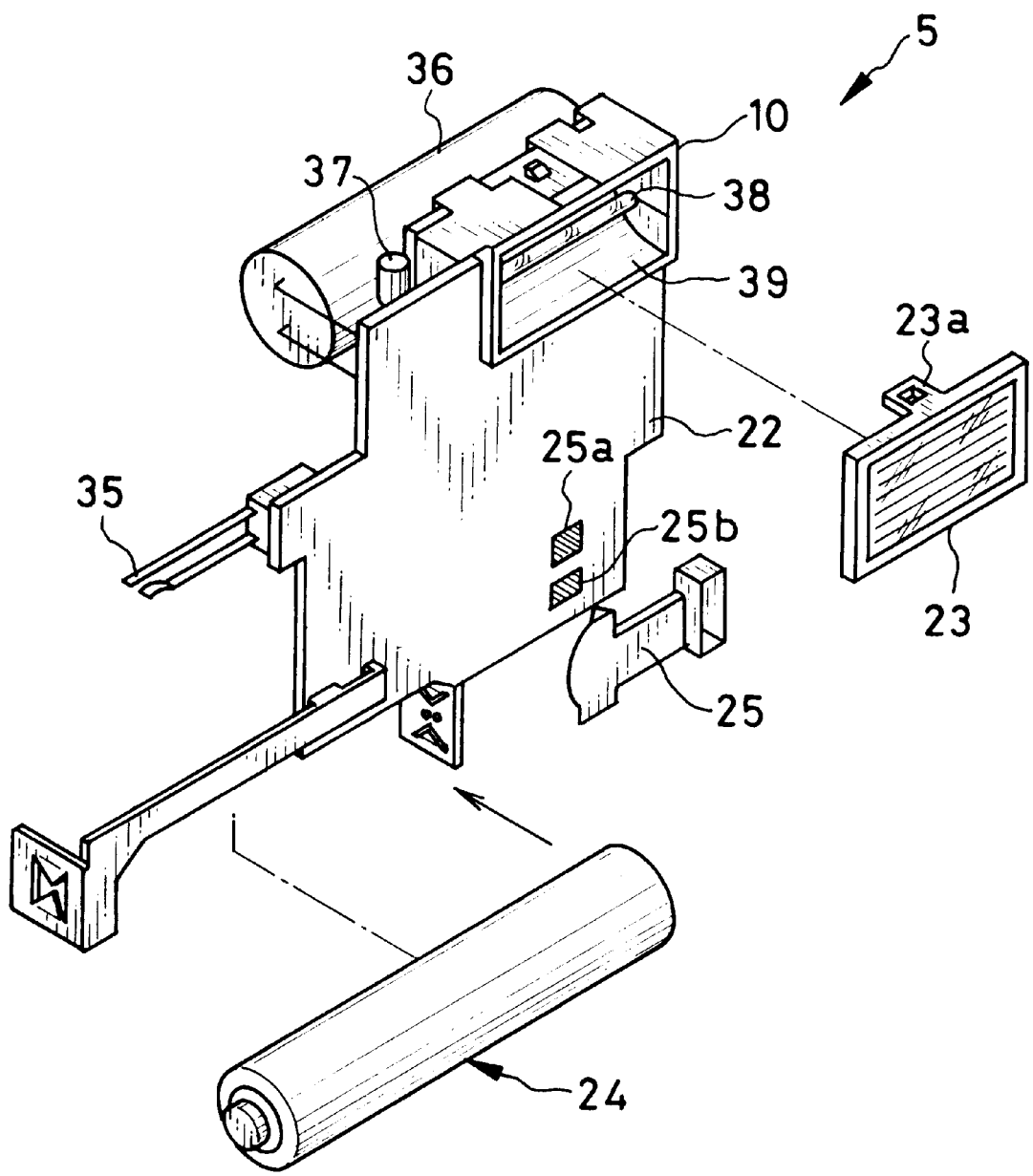
FIG. 3 is an enlarged perspective view of a flash device incorporated into the lens-fitted photo film unit.

As shown in detail in FIG. 3, the flash device 5 is constituted of the light projecting portion 10, a circuit board 22, a battery 24, a charge switch plate 25, a synchronized-flash switch 35, a main capacitor 36, a charge condition indicator 37. A pair of charge switch contact chips 25a and 25b and other flash circuit elements are printed on the circuit board 22. The light projecting portion 10, the synchronized-flash switch 35, the main capacitor 36 and the charge condition indicator 37 are securely mounted to the circuit board 22.

When the charge switch button 13 is pressed, the charge switch plate 25 is brought into contact with the contact chips 25a and 25b, connecting between the contact chips 25a and 25b and thus causing the flash circuit to start charging the main capacitor 36. The charge condition indicator 37 emits light when the main capacitor 36 is fully charged. The light from the charge condition indicator 37 is projected to the outside through the charge condition indicator hole 16.

The light projecting portion 10 is constituted of a flash discharge tube 38, a flash reflector 39 for effectively reflecting the flash light from the flash discharge tube 38 toward a photographic subject located in front of the film unit 1, a protector plate 23 placed in front of the flash discharge tube 38, and a reflector case 40. By mounting the flash discharge tube 38, the reflector 39 and the protector plate 23 into the reflector case 40, the light projecting portion 10 is provided as an integral unit. The protector plate 23 is provided for protecting the flash discharge tube 38 and the flash reflector 39 from dusts or the like, and also for equalizing the flash light.

Figure 4:
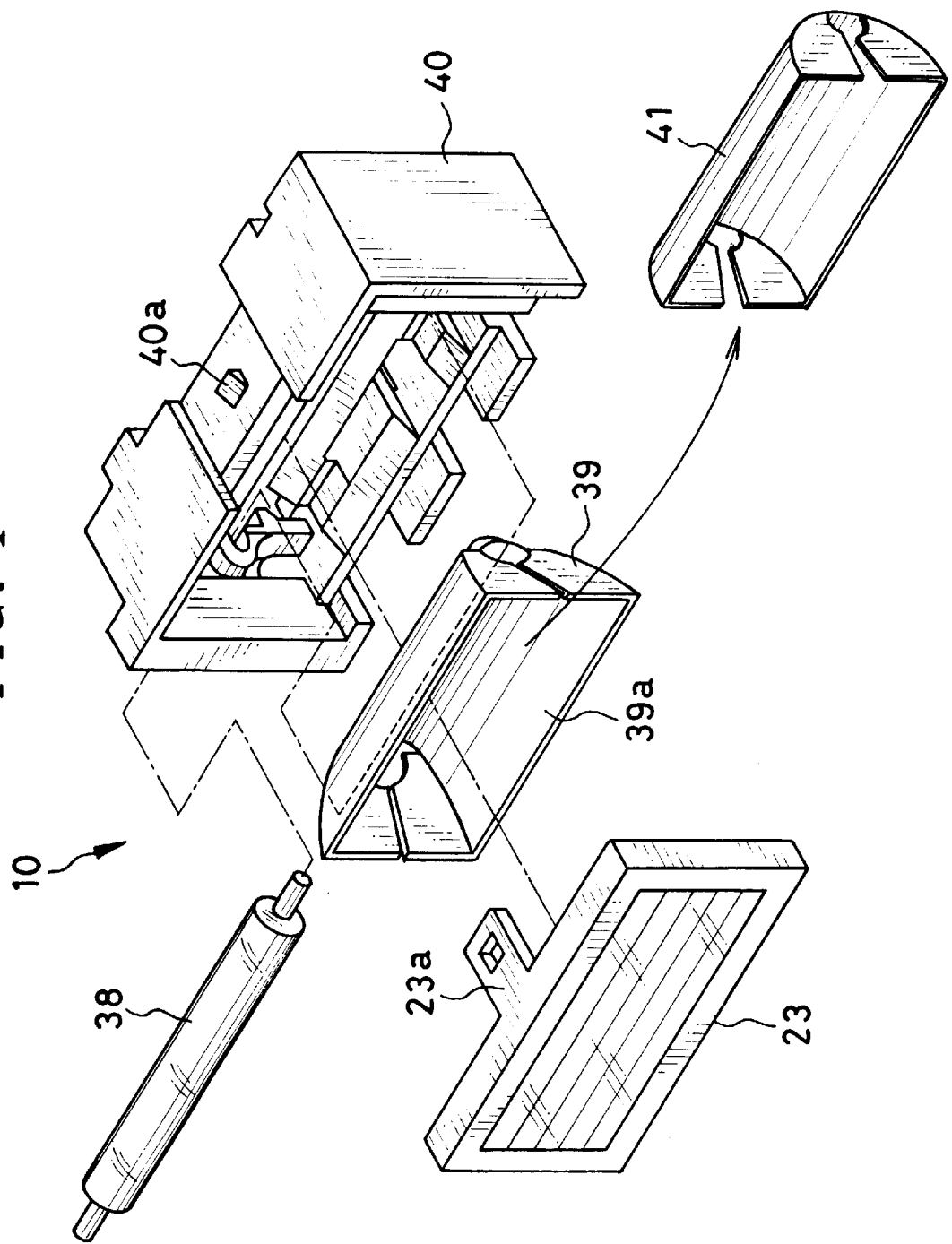
FIG. 4 is an exploded perspective view of a light projecting portion of the flash device of FIG. 3.

When manufacturing the light projecting portion 10, a metal sheet material having a mirror surface 39a is blanked and folded with its mirror surface 39a inside, to form the flash reflector 39. As shown in FIG. 4, the mirror surface 39a of the flash reflector 39 is parabolically concave. The flash reflector 39 is then transported to an assembly process for assembling the flash reflector 39 into the light projecting portion 10 and then the light projecting portion 10 into the flash device 5. In order to protect the mirror surface 39a from getting damaged during the blanking and folding process as well as during the transportation, the mirror surface 39a of the metal sheet material is covered with a protection film 41, a thin plastic film, e.g. a vinyl film. The protection film is removed from the mirror surface 39a after the flash reflector 39 is mounted in the reflector holder 40. It is alternatively possible to remove the protection film immediately before the flash reflector 39 is mounted in the reflector holder 40. Thereafter, the flash discharge tube 38 is mounted in the reflector holder 40, and then the protector plate 23 is attached to the front of the reflector holder 40 through a snap-in engagement between a hook 40a of the reflector holder 40 and an engaging portion 23a of the protector plate 23.

Figure 5:
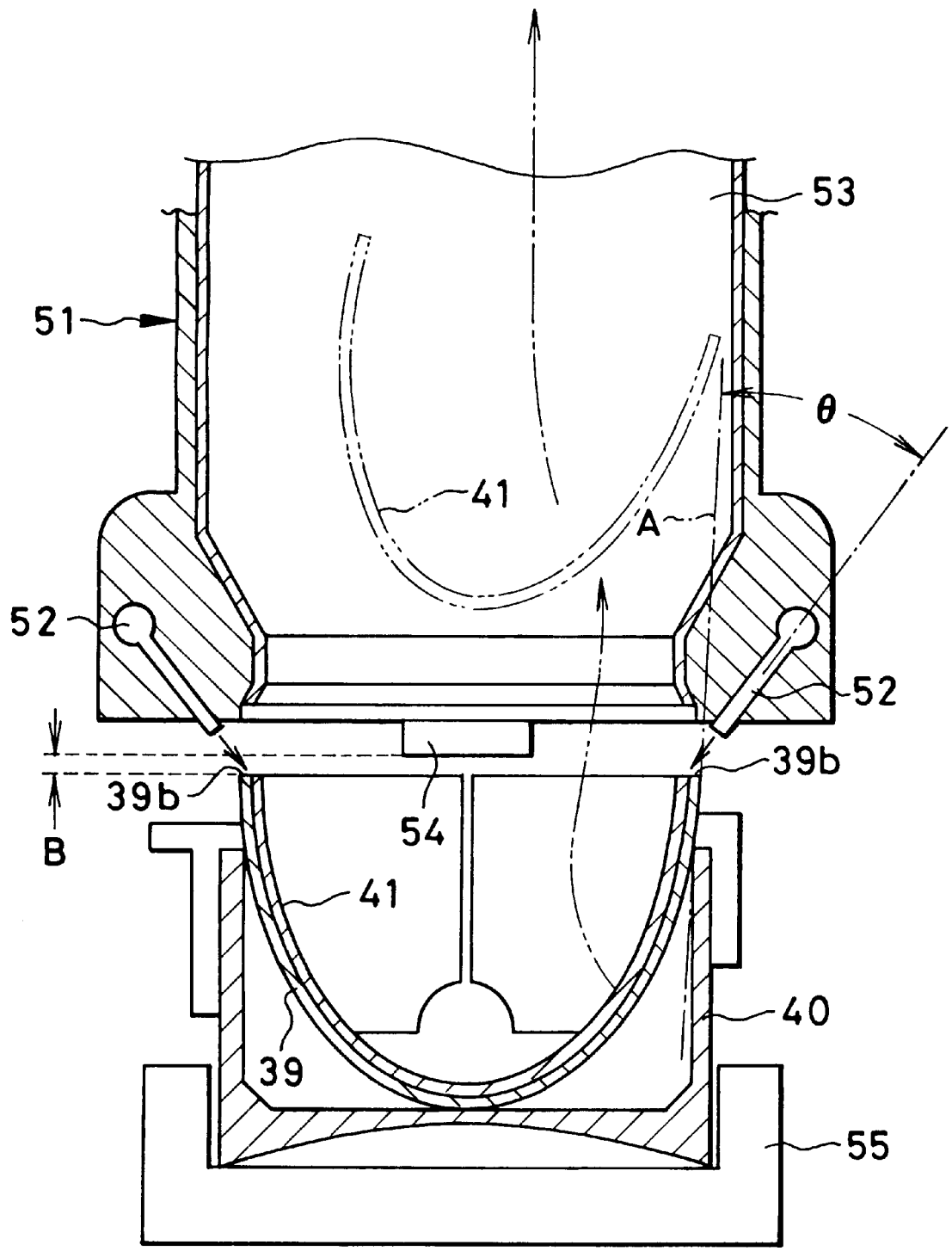
FIG. 5 is a sectional view illustrating the light projecting portion and a protection film removing apparatus for removing a protection film from a flash reflector of the light projecting portion, according to an embodiment of the invention.
Figure 6:
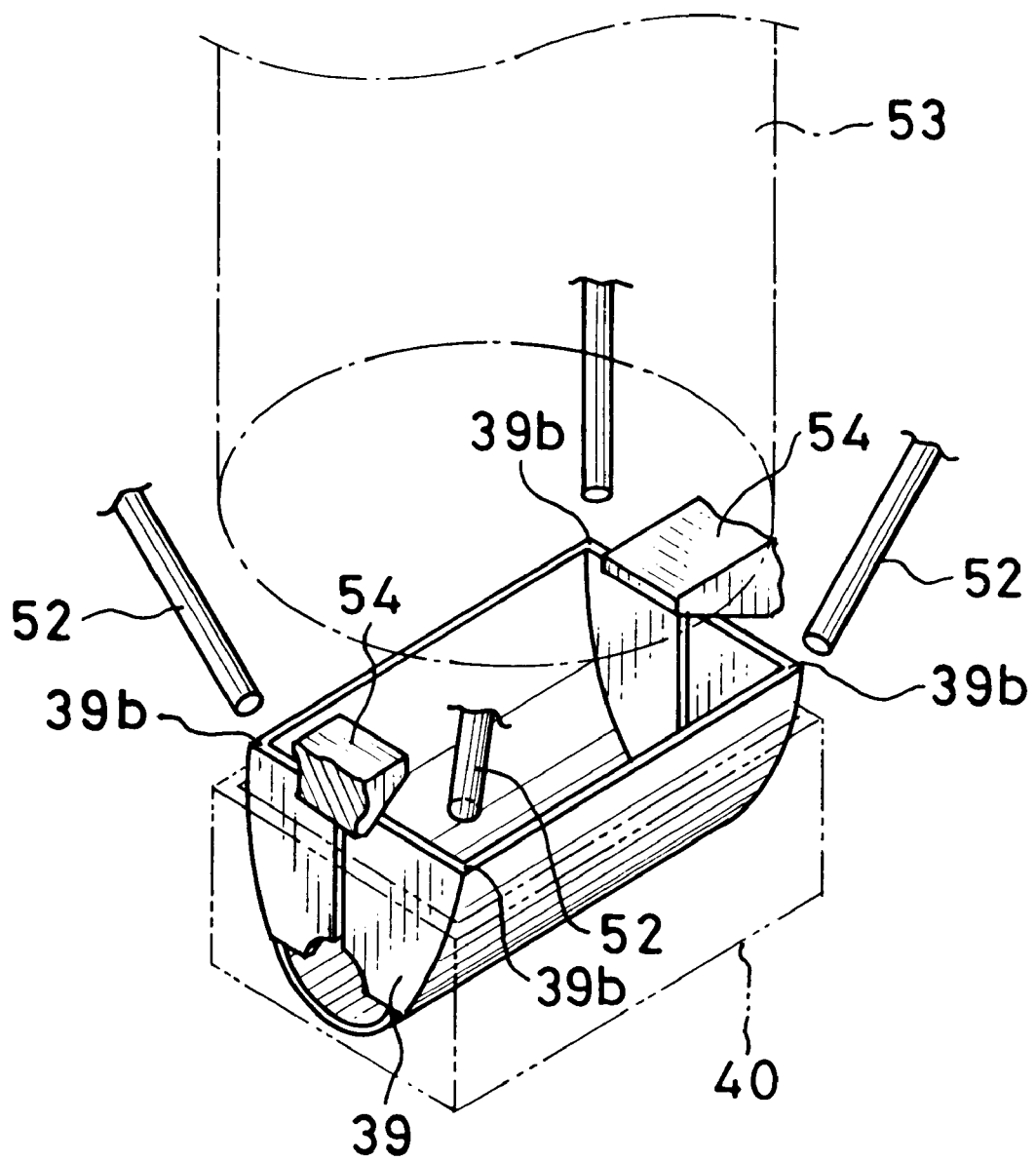
FIG. 6 is an explanatory view for illustrating the operation of the protection film removing apparatus of FIG. 5.

According to an embodiment of the present invention, the protection film 41 is removed by use of a protection film removing device 51 as shown in FIGS. 5 and 6. The protection film removing device 51 is mainly constituted of four gas jet nozzles 52, a vacuum suction tube 53, and a pair of protrusions 54. The gas jet nozzles 52 are located around the vacuum suction tube 53 such that they shoot gas at four corners 39b of a face end of the flash reflector 39 when the flash reflector 39 is centrally positioned under a center of the vacuum suction tube 53. In the shown embodiment, the flash reflector 39 with the protection film 41 is conveyed to the protection film removing device 51 by a conveyer tray 55 after the flash reflector 39 is mounted in the reflector holder 40.

The gas jet nozzles 52 are supplied with compressed gas, e.g., compressed air, from a not-shown gas compressor, so each gas jet nozzle 52 sends out a jet of gas toward one of the four corners 39b of the flash reflector 39. Each gas jet nozzle 52 is preferably inclined radially outward the flash reflector 39 at an angle $\theta$ with respect to a tangent A to the face end of the parabolic mirror surface 39a of the flash reflector 39, as shown in FIG. 5. The angle $\theta$ is preferably 0° to 45°.

The gas from the gas jet nozzles 52 blows the protection film 41 off the mirror surface 39a of the flash reflector 39. To blow off the protection film 41 effectively, it is preferable to drive the gas jet nozzles 52 intermittently, e.g. three times in 1.8 seconds to each flash reflector 39. The vacuum suction tube 53 is connected to a not-shown vacuum sucking device, so the protection film 41 removed from the flash reflector 39 is sucked into the vacuum sucking device through the vacuum suction tube 53, as illustrated by the phantom line in FIG. 5.

Because the flash reflector 39 is so light that it can be separated from the reflector holder 40 by the sucking force of the vacuum suction tube 53, the protrusions 54 protrude radially inward the vacuum suction tube 53 above the front face of the flash reflector 39, as shown in FIG. 6, for preventing the flash reflector 39 from being sucked into the vacuum suction tube 53. The protrusions 54 are spaced away from the face end of the flash reflector 39 by a distance B, as shown in FIG. 5, so that the protrusions 54 may not hinder the protection film 41 from being sucked up into the vacuum suction tube 53. The distance B is preferably 0.2 mm to 2 mm. For the same purpose, that is, for smoother suction of the protection film 41, the protrusions 54 are tapered off to their inner ends, as shown in FIG. 6. Although the shown embodiment has merely two protrusions 54 which are placed above two opposite sides of the face end, it is possible to provide four protrusions for preventing the flash reflector 39 from being sucked into the vacuum suction tube 53 may be provided above four sides of the face end of the flash reflector 39.

The protection film removing device 51 operates as follows. The flash reflector 39 having the mirror surface 39a covered with the protection film 41 is mounted in the reflector holder 40. Then the reflector holder 40 with the flash reflector 39 is put on the conveyer tray 55 with the mirror surface 39 oriented upward, to be conveyed to the protection film removing device 51. When the flash reflector 39 is positioned under the protection film removing device 51, as shown in FIG. 5, the gas jet nozzles 52 intermittently shoot the gas at the corners 39a of the flash reflector 39. Since small gaps are formed between the protection film 41 and the mirror surface 39a at the corners 39b when the corners 39b are formed by folding the blanked metal sheet, the gas blows into the gaps, and peel the protection film 41 off the mirror surface 39a. Thereafter, the peeled protection film 41 is sucked into the vacuum suction tube 53. After the removal of the protection film 41, the flash reflector 39 in the reflector holder 40 is conveyed to the assembly process for mounting the flash discharge tube 38 in the flash reflector 39 and then attaching the protector plate 23 to the front of the flash reflector 39.

In this way, the protection film 41 is quickly and automatically removed from the flash reflector 39 without the danger of damaging the mirror surface 39a of the flash reflector 39. Therefore, the present invention highly contributes to improving the efficiency of manufacture of the flash device.

Although the flash reflector 39 has a parabola section, as shown in FIG. 5, the flash reflector 39 may have a substantially trapezoid section. In that case, the gas jet nozzle 52 is preferably inclined at an angle of 0° to 45° with respect to a prolonged line from the mirror surface of the flash reflector 39.

The present invention is of course applicable to any type of flash reflectors used in cameras as well as those used in lens-fitted photo film units, for removing the protection film from the mirror surface.

Although the above embodiment has four gas jet nozzles for shooting gas at the four corners of the flash reflector, the number of the gas jet nozzles is not limited to four, but may be more than or less than four.

Thus, the present invention is not to be limited to the above embodiment, but on the contrary, various modifications may be possible to those skilled in the art without departing from the scope of the appended claims.

What is claimed is:

1. A method of removing a protection film from a flash reflector of a flash device, the flash reflector having a concave mirror surface for reflecting light from a flash discharge tube which is mounted inside the flash reflector, the flash reflector being formed by blanking and folding a metal sheet with the mirror surface, the mirror surface having been covered with the protection film before the flash discharge tube is mounted in the flash reflector, the method comprising the steps of:

shooting gas at corners of a face end of the flash reflector to blow the protection film off the mirror surface; and thereafter sucking the protection film out of the flash reflector by vacuum suction.

2. A method as claimed in claim 1, wherein the gas is intermittently shot at the corners of the flash reflector.

3. An apparatus for removing a protection film from a flash reflector of a flash device, the flash reflector having a concave mirror surface for reflecting light from a flash discharge tube which is mounted inside the flash reflector, the flash reflector being formed by blanking and folding a metal sheet with the mirror surface, the mirror surface having been covered with the protection film before the flash discharge tube is mounted in the flash reflector, the apparatus comprising:

gas jet nozzles for shooting gas at a face end of the flash reflector to blow the protection film off the mirror surface, the gas jet nozzles being inclined radially outward the flash reflector at an angle of 0° to 45° with respect to a tangent to the face end of the mirror surface or to a prolonged line from the mirror surface; and a vacuum suction tube that is opposed to a center of the mirror surface of the flash reflector for sucking the protection film after being blown off the mirror surface.

4. An apparatus as claimed in claim 3, wherein four gas jet nozzles are mounted stationary around the vacuum suction tube to shoot the gas at four corners of the face end of the flash reflector.

5. An apparatus as claimed in claim 4, further comprising protrusions protruding radially inward the vacuum suction tube above the front face of the flash reflector, for preventing the flash reflector from being sucked into the vacuum suction tube, the protrusions being spaced away from the front face of the flash reflector by a distance of 0.2 mm to 2 mm, so that the protrusions may not hinder the protection film from being sucked into the vacuum suction tube.

6. An apparatus as claimed in claim 5, wherein the protrusions are tapered off radially inward the vacuum suction tube.

* * * * *